United States Patent [19]
Shelly et al.

[11] 4,253,138
[45] Feb. 24, 1981

[54] FAST/SLOW ACTING CURRENT LIMITED FOR INVERTER POWER SUPPLY

[75] Inventors: Randolph D. W. Shelly, Rosemere; Gordon G. Cook, Dollard Des Ormeaux, both of Canada

[73] Assignee: Sperry Corporation, New York, N.Y.

[21] Appl. No.: 8,457

[22] Filed: Feb. 1, 1979

[51] Int. Cl.³ .................. H02M 1/18; H02H 7/122
[52] U.S. Cl. .................................................. 363/56
[58] Field of Search .............................. 363/24–26, 363/55–57, 95–97

[56] References Cited

U.S. PATENT DOCUMENTS

| | | |
|---|---|---|
| 3,843,919 | 10/1974 | Yamamura et al. ............... 363/25 |
| 3,859,583 | 1/1975 | Re ed ................................ 363/26 |
| 3,859,586 | 1/1975 | Wadlington ..................... 363/25X |
| 3,916,282 | 10/1975 | Rothermel ........................ 363/25 |
| 4,032,830 | 6/1977 | Buonavita ........................ 363/25 |
| 4,150,423 | 4/1979 | Boschert ........................ 363/56 X |
| 4,150,424 | 4/1979 | Nuechterlein ................. 363/56 X |

Primary Examiner—William M. Shoop
Attorney, Agent, or Firm—Kenneth T. Grace; William E. Cleaver; Marshall M. Truex

[57] ABSTRACT

Inverter power supply control circuitry that protects power supply components from relatively quick-changing over-current conditions and that provides regulation of the power supply's output current upon relatively slow-changing load conditions.

5 Claims, 2 Drawing Figures

FAST/SLOW ACTING CURRENT LIMITED FOR INVERTER POWER SUPPLY

BACKGROUND OF THE INVENTION

In the prior art it is known to provide regulated DC power to a load using an inverter power supply—see the publication "Power Supplies for Computers and Peripherals," S. Davis, Computer Design, July, 1972, Pages 55 through 65. Generally, a filtered DC input voltage is inverted to a bi-directional DC signal that is coupled to a center tap of an input winding of an output or coupling transformer via switching transistors. Control circuitry is coupled to the output winding of the coupling transformer to regulate the output voltage across the load. Additionally, current sensing circuitry on the output side of the coupling transformer may be utilized to provide overload or short circuit protection for variations in loading—see the publication "Here Are More Protective Circuits," A. Annunziato, Electronic Design 10, May 13, 1971, Pages 64 through 67, with particular reference to FIG. 12. However, it is desirable that such inverter power supplies include both fast-acting and slow-acting reactions to fast-changing and slow-changing variations in loading.

SUMMARY OF THE INVENTION

In the present invention, a variable-amplitude, pulse-width-modulator (PWM) current signal from an inverter power supply's switching transistors is sampled by a transformer-coupled current detector that generates a corresponding sample voltage $v_s$ level. This sample voltage $v_s$ is coupled to a slow-acting current limiting circuit and to a voltage regulator. The voltage regulator is referenced to a feedback voltage $v_{fb}$, from the power supply's load circuit generating a control voltage $v_c$. The control voltage $v_c$ is, in turn, coupled back to the PWM that controls the duty cycle of the switching transistors and, in turn, the duty cycle of the PWM current signal. Slow changes in the feedback voltage $v_{fb}$ or the sample voltage $v_s$ cause appropriate slow changes in the control voltage $v_c$, which maintains, via a corresponding change in the duty cycle of the switching transistors, a regulated output voltage at the power supply's load. A fast change in the sample voltage $v_s$ is detected by a fast-acting current limiting circuit to cause a fast change in the control voltage $v_c$ and a corresponding fast change in the duty cycle of the PWM current signal and a corresponding change in the regulated output voltage.

DESCRIPTION OF THE PREFERRED EMBODIMENT

Figure 1:
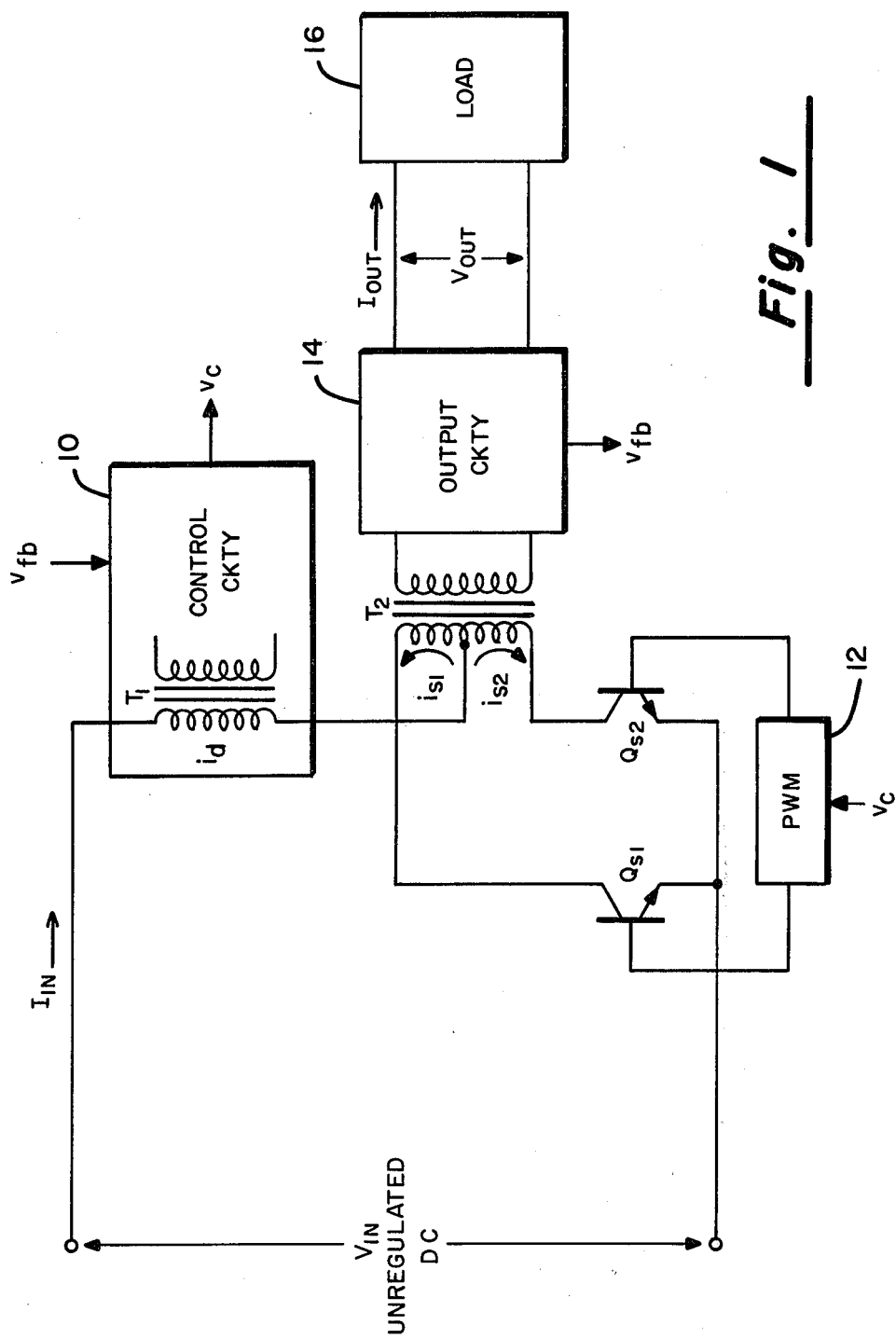
FIG. 1 is a block diagram of a portion of an inverter power supply incorporating the present invention.

With particular reference to FIG. 1 there is illustrated a portion of an inverter power supply in which the control circuitry 10 of the present invention is incorporated. A high voltage, unregulated DC voltage $V_{IN}$ is coupled to the primary winding of sampling transformer $T_1$ and is then coupled to the center tap of the primary winding of output or coupling transformer $T_2$. The end terminals of the primary winding of output transformer $T_2$ are, in turn, coupled to switching transistors $Q_{S1}$ and $Q_{S2}$. Switching transistors $Q_{S1}$ and $Q_{S2}$, which are controlled by the pulse-width-modulator (PWM) 12, couple a pulse width modulated current signal to the secondary winding of output transformer $T_2$. The output circuitry 14 samples the output current flowing through the load 16 providing a feedback voltage $v_{fb}$. This feedback voltage $v_{fb}$ is coupled to control circuitry 10, which is coupled to the secondary winding of sampling transformer $T_1$, and which, in turn, generates a control voltage $v_c$. Control voltage $v_c$ is, in turn, coupled to the PWM 12 for controlling the duty cycle or pulse width of the switching transistors $Q_{S1}$ and $Q_{S2}$ and, in turn, the load or output voltage $V_{OUT}$. The present invention is directed toward the control circuitry 10.

Figure 2:
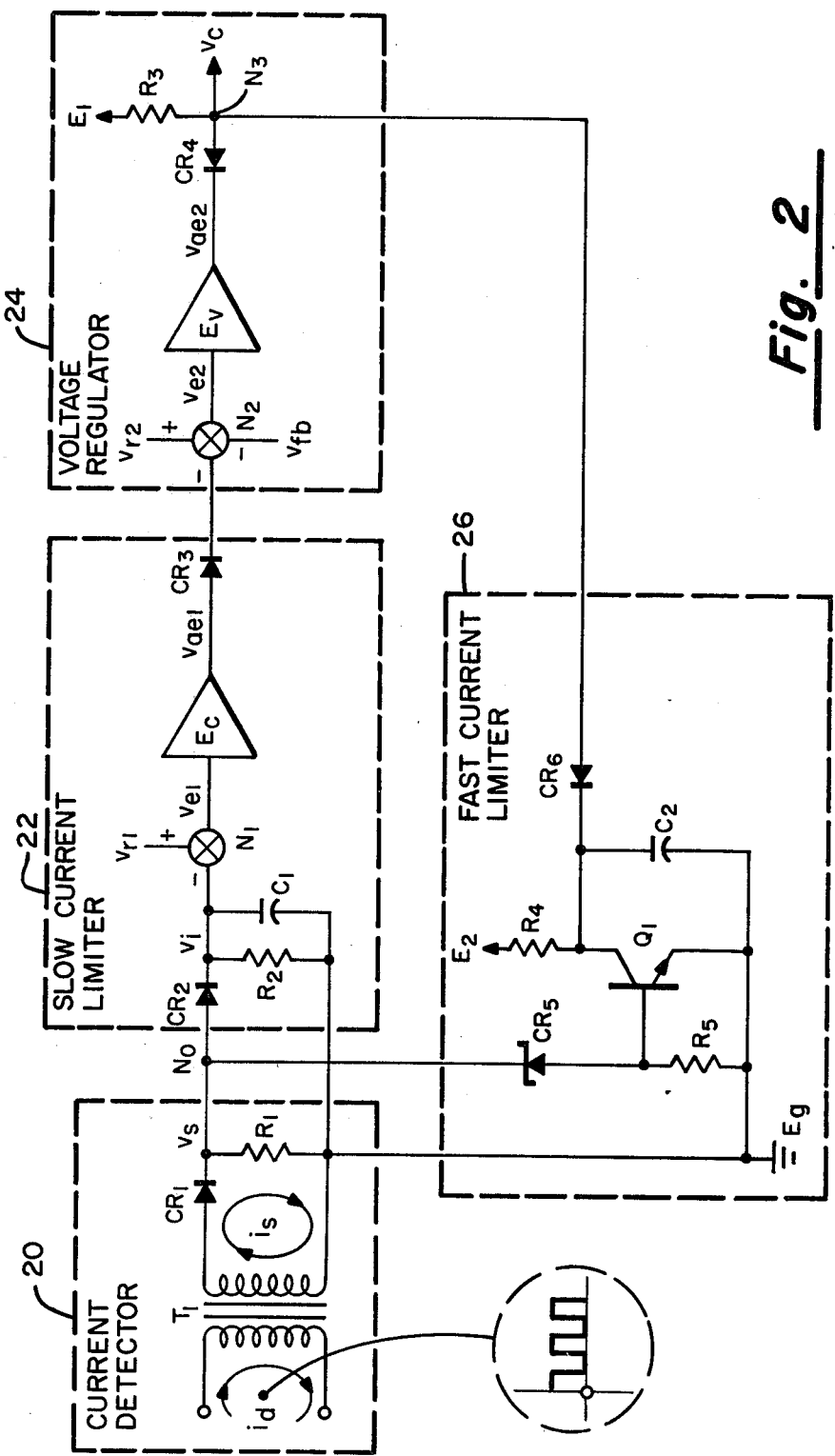
FIG. 2 is a schematic illustration of the control circuitry of the present invention.

With particular reference to FIG. 2 there is presented a schematic illustration of the control circuitry 10 of the present invention. A variable-amplitude, variable duty cycle current signal $i_d$ is sampled by a transformer-coupled current detector 20 that generates a corresponding sample voltage $v_s$ level. This sample voltage $v_s$ is representative of the power supply's output current for steady state operation. This sample voltage $v_s$ is coupled to a slow-acting current limiting circuit 22 and to a voltage regulator 24. The voltage regulator 24 is referenced to a fixed-level reference voltage $v_{r2}$ and to a variable feedback voltage $v_{fb}$, from, e.g., the power supply's output circuitry 14, for generating a control voltage $v_c$. The control voltage $v_c$ is, in turn, coupled back to the PWM 12 that controls the duty cycle of the switching transistors $Q_{S1}$ and $Q_{S2}$ and, in turn, the duty cycle of the PWM current signal $i_s = i_{s1} + i_{s2}$ that flows through the primary winding of the output transformer $T_2$. Slow changes in the feedback voltage $v_{fb}$ or the sample voltage $v_s$ cause appropriate slow changes in the control voltage $v_c$, which maintains, via a corresponding change in the duty cycle of the switching transistors $Q_{S1}$ and $Q_{S2}$, a regulated output voltage $V_{OUT}$ at the power supply's load 16. A fast change in the sample voltage $v_s$ is detected by a fast-acting current limiting circuit 26 to cause a fast change in the control voltage $v_c$ and a corresponding fast change in the duty cycle of the PWM current signal $i_s$ and a corresponding change in the regulated output voltage $V_{OUT}$.

Current detector 20 is comprised of a current transformer $T_1$, rectifying diode $CR_1$ and resistor $R_1$. The current signal $i_d$, which flows through the primary winding of current transformer $T_1$, is converted to a sample voltage $v_s$ across resistor $R_1$, which is, in turn, coupled at node $N_0$ to slow-acting current limiter 22 and to fast-acting current limiter 26.

Slow-acting current limiter 22 is comprised of: (1) a peak detector including diode $CR_2$, resistor $R_2$ and capacitor $C_1$ that at node $N_1$ converts the pulse sample voltage $v_s$ to an equivalent DC voltage $v_i$ level; (2) a summing node $N_1$ which compares the voltage $v_i$ to a fixed or constant level reference voltage $v_{r1}$ generating an error voltage $v_{e1}$; and (3) an error amplifier $E_c$ which generates the amplified error voltage $v_{ae1}$ which, in turn, couples the amplified error voltage $v_{ae1}$ to voltage regulator 24 via diode $CR_3$.

Voltage regulator 24 is comprised of: (1) a summing node $N_2$ which generates an error voltage $v_{e2}$ from a fixed or constant level reference voltage $v_{r2}$, amplified error voltage $v_{ae1}$ and a variable feedback voltage $v_{fb}$ from, e.g., output circuitry 14; (2) error amplifier $E_v$ which generates the amplified error voltage $v_{ae2}$; and, (3) rectifying diode $CR_4$ which couples the rectified amplified error voltage $v_{ae2}$ to node $N_4$ which is coupled to a fixed or constant level reference voltage $E_1$ by resistor $R_3$.

Fast-acting current limiter 26 is comprised of zener diode $CR_5$, rectifier diode $CR_6$, NPN transistor $Q_1$, resistors $R_4$ and $R_5$, and capacitor $C_2$. Whenever the sample voltage $v_s$ at node $N_0$ exceeds the zener voltage of zener diode $CR_5$ and the base-emitter voltage drop of transistor $Q_1$, transistor $Q_1$ is switched ON discharging capacitor $C_2$ to ground therethrough. This forward biases rectifier diode $CR_6$ causing control voltage $v_c$ at node $N_4$ to quickly drop toward ground through transistor $Q_1$. The decreasing control voltage $v_c$ at PWM 12 decreases the duty cycle of the switching transistors $Q_{S1}$ and $Q_{S2}$ forcing the PWM current signal $i_s$ to a lower safe level. Note that in the configuration shown, an increase in the control voltage $v_c$ will provide a corresponding increase in the duty cycle of the switching transistors $Q_{S1}$ and $Q_{S2}$.

What is claimed is:

1. An inverter power supply incorporating both fast and slow acting current limiters, comprising:

a source of an unregulated current signal;

current transformer means having primary winding means coupled to said unregulated current signal and secondary winding means;

current detector means including said current transformer means for generating a variable sample voltage $v_s$ from said unregulated current signal;

output transformer means having primary winding means coupled to said unregulated current signal and secondary winding means;

output circuitry means coupled to said output transformers means' secondary winding means for generating a variable feedback voltage $v_{fb}$ that varies with the variation in the loading coupled thereto;

switching means coupled to said primary winding means of said output transformer means for bidirectionally coupling a pulsed current signal of variable duty cycle thereto;

pulse width modulator means coupled to said switching means for modulating the pulse width of said pulsed current signal in response to a variable control voltage $v_c$;

slow current limiter means coupled to said current detector means for converting said variable sample voltage $v_s$ to an equivalent variable DC voltage $v_i$ level, comparing said variable DC voltage $v_i$ level to a fixed level DC reference voltage $v_{r1}$ and generating a variable error voltage $v_{ae1}$ therefrom that provides compensation in said variable control voltage $v_c$ for slow changes in said variable sample voltage $v_s$;

voltage regulator means coupled to said variable error voltage $v_{ae1}$ for combining said variable error voltage $v_{ae1}$, said variable feedback voltage $v_{fb}$ and a fixed level reference voltage $v_{r2}$ and generating an amplified variable error voltage $v_{ae2}$ therefrom and further including current rectifier means for rectifying said amplified variable error voltage $v_{ae2}$ to generate a variable control voltage $v_c$ that provides a corresponding variable compensation in the duty cycle of said pulsed current signal by said pulse width modulator means; and, fast current limiter means coupled to said variable sample voltage $v_s$ and said variable control voltage $v_c$ including zener diode means, transistor means, and diode means, said diode means being forward biased whenever said variable control voltage $v_c$ exceeds the zener voltage of said zener diode means and the base drive of said transistor means for quickly decreasing said variable control voltage $v_c$, said quickly decreasing variable control voltage $v_c$ generating a corresponding decrease in the duty cycle of said pulsed current signal by said pulse width modulator means.

2. An inverter power supply incorporating both fast and slow acting current limiters, comprising:

a source of an unregulated current signal;

current detector means coupled to said unregulated current signal for generating a sample voltage $v_s$ from said unregulated current signal;

output transformer means coupled to said unregulated current signal;

output circuitry means coupled to said output transformer means for generating a variable feedback voltage $v_{fb}$ that varies with the variation in the loading coupled thereto;

switching means coupled to said output transformer means for bidirectionally coupling a pulsed current signal thereto;

pulse width modulator means coupled to said switching means for modulating the pulse width of said pulsed current signal in response to a variable control voltage $v_c$;

slow current limiter means coupled to said current detector means for generating an error voltage $v_{ae1}$ from said sample voltage $v_s$ that provides compensation in said variable control voltage $v_c$ for slow changes in said sample voltage $v_s$;

voltage regulator means coupled to said error voltage $v_{ae1}$ for generating said variable control voltage $v_c$ from said amplified error voltage $v_{ae1}$ and said feedback voltage $v_{fb}$; and, fast current limiter means coupled to said sample voltage $v_s$ and said variable control voltage $v_c$ including means for quickly decreasing said variable control voltage $v_c$ whenever said variable control voltage $v_c$ suddenly exceeds a predetermined voltage level, said decreasing variable control voltage $v_c$ providing a corresponding decrease in the duty cycle of said pulsed current signal at said pulse width modulator means.

3. The inverter power supply of claim 2 in which said slow current limiter means is comprised of:

a node $N_1$;

a diode $CR_2$ coupling said sample voltage $v_s$ to said node $N_1$;

parallel-coupled resistor $R_2$ and capacitor $C_1$ coupling said node $N_1$ to a fixed-level reference voltage $E_g$;

means coupling a fixed-level reference voltage $v_{r1}$ to said node $N_1$ for generating an error voltage $v_{e1}$;

error amplifier means $E_c$ for generating an error voltage $v_{ae1}$ from said error voltage $v_{e1}$; and, diode means for coupling said error voltage $v_{ae1}$ to an output terminal.

4. The inverter power supply of claim 2 in which said voltage regulator means is comprised of:

a node $N_2$;

means coupling said error voltage $v_{ae1}$ from said slow current limiter means to said node $N_2$;

means coupling said feedback voltage $v_{fb}$ to said node $N_2$;

means coupling a fixed-level reference voltage $v_{r2}$ to said node $N_2$;

said error voltage $v_{ae1}$, said feedback voltage $v_{fb}$ and said fixed-level reference voltage $v_{r2}$ generating at said node $N_2$ an error voltage $v_{e2}$;

error amplifier means $E_v$ coupled to said error voltage $v_{e2}$ at said node $N_2$ for generating an error voltage $v_{ae2}$;

a node $N_3$;

resistor means $R_3$ for coupling said node $N_3$ to a fixed-level reference voltage $E_1$; and, diode means $CR_4$ for coupling the error voltage $v_{ae2}$ to said node $N_3$ for generating said control voltage $v_c$ at said node $N_3$.

5. The inverter power supply of claim 2 in which said fast current limiter means is comprised of:

transistor means $Q_1$ having collector, base and emitter electrodes;

zener diode means $CR_5$ coupling said node $N_0$ to the base electrode of said transistor means $Q_1$;

diode means $CR_6$ coupling said node $N_3$ to the collector electrode of said transistor means $Q_1$;

resistor means $R_4$ coupling a fixed-level reference voltage $E_2$ to the collector electrode of said transistor means $Q_1$;

capacitor means $C_2$ coupling said transistor means $Q_1$ collector electrode to said transistor means $Q_1$ emitter electrode;

resistor means $R_5$ coupling said transistor means $Q_1$ base electrode to said transistor means $Q_1$ emitter electrode; and, means coupling said transistor means $Q_1$ emitter electrode to a fixed-level reference voltage $E_g$.

* * * * *